Patented Feb. 26, 1935

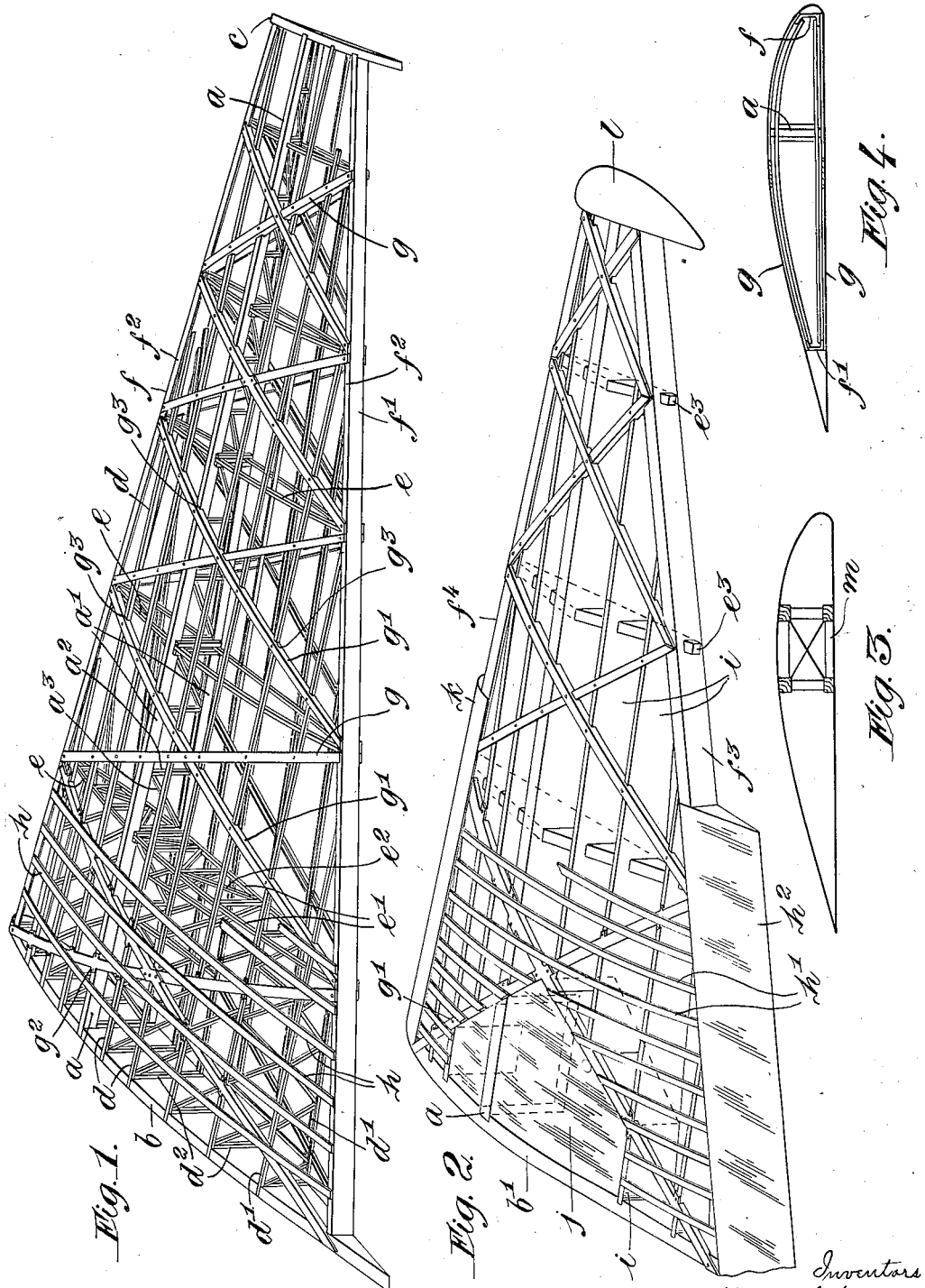

1,992,560

UNITED STATES PATENT OFFICE 1,992,560

AEROPLANE WING STRUCTURE

Francis Samuel Welman and Arthur Levell,
Bexley Heath, England

Application March 2, 1934, Serial No. 713,747
In Great Britain March 1, 1933

6 Claims. (Cl. 244—31)

This invention relates to improvements in wings for aircraft. In any system of construction adopted for such wings it is necessary to ensure adequate strength and rigidity at the outer or free end of the wing in order to prevent excessive vibration or deflection and to withstand the torsional loads, particularly those set up by aileron operation, which would otherwise distort or twist the wing from the tip inwards. To meet this need there have been devised various means such as a triangulation of bracing wires or rods about a single spar; box spars, with or without internal triangulation; or a plurality of stiffened spars; while means have also been proposed for enabling the skin to take these torsional loads. The success of some of these devices in attaining the necessary degree of rigidity has, however, usually been accompanied by a prejudicial increase in weight and/or by undesirable complexity of structure.

The object of the present invention is to provide a simple and rigid construction of light weight which can be produced economically in large numbers and in which the drag and torsion loads are taken by members external to the spar, so that the latter need be designed for taking only the lift load.

The invention is concerned with wings having a longitudinal spar at the maximum depth of the wing section and a series of transverse cantilever ribs supported by the spar, and is characterized by the fact that the wing frame is braced by tension-compression members extending somewhat spirally around and along the wing, to provide a continuous and uninterrupted reinforcement for withstanding drag and torsion loads. The tension-compression members may be arranged on both the upper and lower wing surfaces so as to cross each other diagonally of the bays provided by the transverse cantilever ribs, the tension-compression members on the upper wing surface being united to front and rear longitudinals at junctions common with those of underlying tension-compression members on the lower wing surface. Owing to the small depth of an aeroplane wing in relation to its chord, a small amount of deflection in the connections of a reinforcement on respective wing surfaces would permit a considerable degree of distortion in the wing angle. The present invention by avoiding discontinuity of the reinforcement around the wing enables the wing to retain its original angle of incidence throughout its span, while the number of reinforcing members can be reduced to a minimum. The base of the triangulation formed by the diagonal members extends the whole width of the braced framework of the wing. Also as such members are disposed externally of the spar and longitudinals they are located as far as possible from the neutral axis of the wing. As a result the component parts of these members which may be built-up, or of tubular or rolled section, can be of minimum weight and size. The size and weight of the main spar can also be reduced since it is only necessary for this member to take the lift load. Further, since the said members are adapted for taking compressional as well as tensional stresses they are all operative under a given load and none is redundant and the necessary rigidity is secured without the use of internal cross-bracing. The arrangement of such members externally of the spar and longitudinals enables them to be readily applied and easily accessible while avoiding the employment of fittings or adjusters on the framework of the wing. The weight of the structure may be reduced as a result, and the construction is correspondingly simplified.

In order to enable the invention to be readily understood reference will be made to the accompanying drawing illustrating by way of example two different constructions for carrying the invention into effect, in which drawing:—

Figure 1 is a perspective view of a wing in accordance with these improvements without a skin covering and edge parts.

Figure 2 is a perspective view of a modified construction.

Figure 3 is a diagrammatic view showing the cross-section of a wing of known construction in which a box spar is employed for taking lift, drag and torsion loads, and Figure 4 is a diagram of a cross-section of a wing in accordance with these improvements.

Referring to Figure 1, the wing comprises a main spar $a$ extending longitudinally along the wing at approximately the maximum depth thereof between an inner root rib $b$ and an outer end rib $c$. The spar $a$ may comprise upper and lower channel section members $a^1$ united by bracing in the form of uprights $a^2$ and diagonals $a^3$. Extending outwards from the root rib $b$ and approximately parallel with the main spar $a$ are a series of light girder longitudinals $d$ comprising upper and lower angle members $d^1$ united by bracing members $d^2$. A number of transverse cantiliver ribs $e$, which may also be built-up from angle members $e^1$ and bracing members $e^2$, spaced apart at appropriate distances, are rigidly attached to the main spar $a$ and longitudinals $d$.

For the sake of clearness the bracing members have been omitted from certain of the ribs $e$ and parts of the longitudinals $d$. The ribs $e$ extend between front and rear longitudinal members $f$ $f^1$ so as to divide the wing into a desired number of bays. The longitudinals $f$ $f^1$ are preferably of channel or angle section the flanges $f^2$ on each member being directed inwardly towards each other.

Diagonal strips $g$ are laid over the longitudinal members $d$ on both the upper and lower surfaces of the wing in each bay formed by the ribs $e$. Each strip $g$ extends from a corner at the leading edge of a bay to a diagonally opposite corner at the rear edge of the bay thereby forming diagonally crossing strips as shown. These strips are adapted to withstand compressional as well as tensional loads and may be of channel section the flanges $g^1$ being directed inwardly and formed with flattened out lugs $g^2$ as shown in the left hand bay, Figure 1, for attachment by rivets or other suitable means to the spar $a$ and longitudinals $d$, $f$ $f^1$. Or the flanges may be slotted at $g^3$ for engagement with the spar and longitudinals as shown in the remaining bays. The strips $g$ need not be diagonal with respect to the bays so long as they are spirally disposed along the wing. If desired the strips $g$ may be of tubular metal, flattened at the points of attachment to the longitudinals, or they may be built-up or made of rolled section material. The inherent rigidity imparted to these members $g$ by their cross-sectional shape, and their attachment at numerous points to the spar and longitudinals is sufficient to enable them to withstand compression and tension loads, so that torsional or other loading sustained by the wing is distributed between all the bracing strips simultaneously, none being idle as in the case where internal bracing wires are used. It is of course obvious that such members $g$ need not necessarily cross over each other in the bays but may be terminated at the spar, to which they are attached at the desired points or junctions by gusset plates or other suitable form of anchorage.

A series of fabric-supporting strips $h$ may be attached to the longitudinals $d$ $f$ $f^1$ at suitable distances along the wing for supporting a fabric covering. These fabric-supporting ribs $h$ may be constructed from light rolled strips or tubes and are arranged on both the upper and lower surfaces of the wing.

It will be seen that the entire structure is adapted to be readily manufactured from light metal sheet or strip which can be plain or rolled into channel or other suitable sections as desired for the particular components. The various built-up components can be manufactured on the bench as complete units without the necessity for fitting or trimming during assemblage, and they are assembled without the use of internal cross-bracing. Thus the assembling is a simple and economical operation which can be performed expeditiously for mass production methods.

In operation of assembling the parts, the root rib $b$, the outer end rib $c$ and the intermediate cantilever ribs $e$ are secured to the spar $a$ in their determined positions. The various girder longitudinals $d$ are then threaded over the ends of the cantilever ribs $e$, on each side of the spar $a$ and are secured to the ribs $e$ at the appropriate points. The front and rear longitudinal members $f$ $f^1$ are then secured to the respective ends of the ribs $e$. The cross-bracing diagonal strips $g$ are now fixed in position on the upper surface of the wing and are secured at all their points of intersection with the spar $a$ and longitudinal members $d$ $f$ $f^1$. This operation renders the structure sufficiently rigid to enable it to be turned upside down to facilitate the fixing of the bracing strips $g$ on the opposite surface, normally the lower surface of the wing. The fabric-supporting ribs $h$ are secured in position over all the other components, and the leading and trailing edge members (not shown) are fixed in position. The wing tip is completed by the fixing of the profile framing and fabric supporting strips at the outer end of the braced structure. The absence of internal plan cross-bracing enables all the members to be designed to the best advantage without the complications entailed for threading diagonal bracing wires or rods through the structural components.

According to the modified construction shown in Figure 2, the inner ends of the central longitudinal members $i$, between the root rib $b^1$ and the bracing strips $g^1$ in the inner bay, are removed, thereby providing a space $j$ for the accommodation of fuel tanks or containers for luggage, bombs or other articles. A similar modification may be applied to Figure 1. Such a construction is rendered possible owing to the fact that the intermediate longitudinals $i$ function as beams but not as cantilevers, thereby enabling the inner ends of some of them to be removed without detrimentally affecting the strength of the structure. In Figure 2 the fabric-supporting strips $h^1$ are continued rearwardly of the rear member $f^3$ to meet adjacent the trailing edge, except at that portion of the wing designed to house the aileron. The latter may conveniently be hinged at the rear ends of two of the outermost cantilever ribs $e^3$ between the fairing $h^2$ and the wing tip $l$. For the sake of clearness the spar $a$, longitudinals $i$ and ribs $e^3$ are shown as plain members. It will be understood that they are suitably constructed from built-up parts as described with reference to Figure 1. The front ends of the strips $h^1$ may or may not be continued past the front longitudinal member $f^4$ to the leading edge which may comprise a rolled strip $k$ of semi-circular section and which may serve as a housing for the aileron control wires. The wing tip $l$ beyond the braced structure may be given a semi-circular or other desired outline in plan by means of a light frame, carrying fabric-supporting strips.

With a cantilever monoplane wing of tapering construction, both in plan and front elevation, as shown in the drawing, the main spar $a$ would preferably be located at the centre of pressure of the wing. The front and rear longitudinal members $f$ $f^1$ or $f^3$ $f^4$ converge from the inner root rib $b$ $b^1$ and are united at their outer ends by a smaller outer rib $c$ at the end of the spar, thus forming a truncated triangle of a taper corresponding to the desired plan shape of the wing. The intermediate girder longitudinals $d$ $i$ are spaced out parallel to the spar $a$ so that only the central members are connected to the outer rib $c$, the outer members terminating at points along the front and rear longitudinals $f$ $f^1$, $f^3$ $f^4$. The spar and the longitudinal members are progressively reduced in depth from the root rib outwards in order to provide the desired tapering front elevation of the wing outline and to correspond with the cross-sectional contour of the wing.

From a comparison of the diagrams shown in

Figures 3 and 4 it will be seen that in the known construction of wing, Figure 3, the tension members $m$ for taking the drag and torsion loads extend over the narrow base of the box spar, thereby involving the employment of strong and heavy tension members, half of which are redundant under a given load. Figure 4 illustrating the cross section of a wing in accordance with these improvements shows that the diagonal tension-compression members $g$ for taking the drag and torsion loads extend over the widest possible base, whereby such members may be of the lightest construction, and none is redundant under a given load and the main spar $a$ takes lift loads only.

Although the invention has been particularly described with reference to cantilever monoplane wings, it will be obvious that it is equally applicable to strutted wings. In the case of the invention being applied to biplanes, the inherent rigidity attained by the structure might render unnecessary the use of more than one interplane strut. It will be obvious also that the construction in accordance with these improvements is equally suitable for a wing having no aileron. Thus the invention is applicable to the wings of a biplane fitted with ailerons only in the upper wing.

We claim:—

1. An aeroplane wing comprising an inner root rib and an outer end rib, a main spar disposed longitudinally of the wing approximately at the maximum depth thereof between said ribs, transverse ribs attached to said spar at intervals along its length, light girder longitudinals extending from said inner root rib and disposed substantially parallel to the main spar, edge longitudinals of rolled section metal adjacent to the front and rear edges of the wing, and strip members of rolled section metal adapted for taking tension and compression loads, said strips being disposed externally of the structure formed by said spar, ribs and longitudinals and crossing each other diagonally in the bays formed by the transverse ribs.

2. An aeroplane wing comprising an inner root rib and an outer end rib, a main spar between said ribs and disposed longitudinally of the wing approximately at the maximum depth thereof, light girder longitudinals extending outwards from said root rib and disposed substantially parallel to said spar, transverse cantilever ribs attached to said spar and longitudinals, edge longitudinals adjacent to the leading and rear edges of the wing and composed of rolled section material having inwardly directed flanges, and strips of rolled section material extending diagonally in the bays formed by said ribs and disposed externally of the structure formed by the spar, ribs and longitudinals on both the upper and lower surfaces of the wing.

3. Aeroplane wing comprising an inner root rib and outer end rib, a main spar disposed longitudinally of the wing approximately at the maximum depth thereof between said ribs, front and rear edge longitudinals of rolled section material adjacent the edges of the wing and attached to said ribs, transverse ribs attached to said spar, the rear ends of the outermost ribs projecting through the rear edge longitudinals to provide a hinge mounting for the aileron, and strips of rolled section material adapted for withstanding tension and compression disposed on the upper and lower surfaces of the wing between said edge longitudinals.

4. An aeroplane wing comprising an inner root rib and an outer end rib, a main spar extending longitudinally along the wing at approximately the maximum depth thereof between said ribs, light girder longitudinals built up from upper and lower angle members united by bracing members, said longitudinals extending outwards from said inner root rib and disposed substantially parallel to said spar, edge longitudinals of rolled section metal adjacent the leading and rear edges of the wing, transverse cantilever ribs built up from upper and lower angle members united by bracing members, said cantilever ribs being rigidly attached to said spar and longitudinals, and tension-compression members of rolled section metal extending between said edge longitudinals on the upper and lower surfaces of the structure formed by said spar, ribs and longitudinals.

5. Aeroplane wing comprising a main spar disposed approximately at the maximum depth of the wing section, transverse cantilever ribs attached to said spar, edge longitudinals adjacent the front and rear edges of the wing, and tension-compression strip members on both wing surfaces extending diagonally across bays provided by said ribs, the ends of said diagonal strip members in succeeding bays and on opposite wing surfaces, being connected to the edge longitudinals at the corners of said bays to provide continuous spiralized reinforcements around and along the wing.

6. Aeroplane wing comprising a main spar disposed approximately at the maximum depth of the wing section, transverse cantilever ribs attached to said spar, edge longitudinals of rolled section metal adjacent the front and rear edges of the wing, and strip members of rolled section metal adapted for taking tension and compression loads, said strips being disposed on both wing surfaces externally of the structure formed by said spar, ribs and longitudinals and intersecting each other diagonally in the bays formed by the ribs, the ends of said diagonal strips being connected to the edge longitudinals at the corners of said bays to provide continuous and oppositely directed spiralized reinforcements extending around and along the wing.

FRANCIS SAMUEL WELMAN.
ARTHUR LEVELL.